July 13, 1965 R. G. LE TOURNEAU 3,194,356
LATCH DEVICES FOR ELECTROMAGNETIC BRAKE MECHANISM
Filed Sept. 24, 1962 2 Sheets-Sheet 1
*Fig. 1*
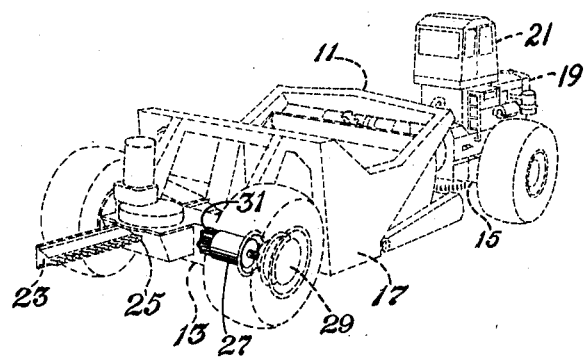
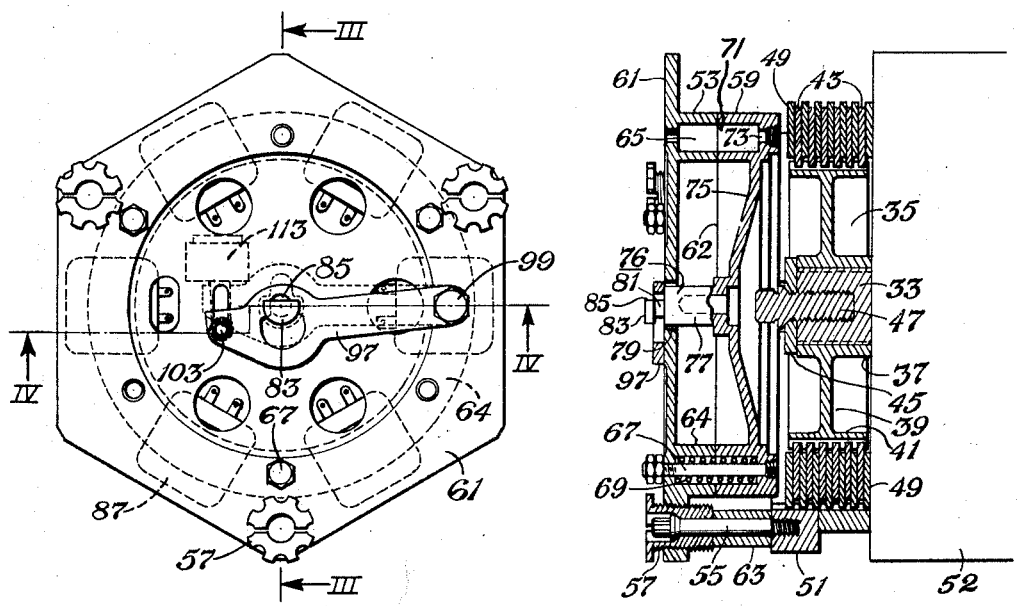
*Fig. 2*
*Fig. 3*
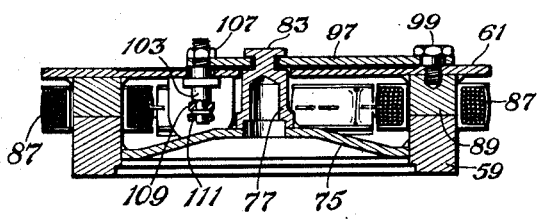
*Fig. 4*
INVENTOR.
Robert G. LeTourneau
BY *Wm. T. Hofford*
Attorney INVENTOR.
Robert G. LeTourneau
BY
Wm. T. Wofford
Attorney United States Patent Office 3,194,356
Patented July 13, 1965

3,194,356
LATCH DEVICES FOR ELECTROMAGNETIC
BRAKE MECHANISM
Robert G. LeTourneau, P.O. Box 2307, Longview, Tex.
Filed Sept. 24, 1962, Ser. No. 225,777
4 Claims. (Cl. 188—171)

My invention relates to electromagnetic brake mechanism and more particularly to latch devices incorporated in electromagnetic friction brake mechanism.

Electromagnetic friction brakes are widely used in industry for many purposes on many types of machines such as cranes, bridges, turntables, heavy earthmoving machinery and the like. One type of electromagnetic brake which is used quite extensively is the multidisk brake which includes a plurality of juxtaposed disks each having friction surfaces. Such multidisk electromagnetic brakes frequently have their rotatable disks disposed on an extension of an electric motor shaft. The nonrotatable disks generally are spring biased into frictional engagement with the rotatable disks when the electric motor is de-energized and they are maintained in disengagement by a plurality of electromagnets or solenoids during the time the motor is energized.

The springs, of course, must be powerful enough to provide effective braking and the electromagnets must be capable of overcoming the spring force and disengaging the disks. If the disks are electrically maintained in disengagement by the electromagnets during the time the motor is running, it is quite apparent that considerable power is required for this purpose alone. Also, the electromagnets are subjected to a continuous type of loading which is undesirable. Thus, it would be quite advantageous to provide a mechanism for maintaining the disks in disengagement without using electric power, but which is easily releasable when desired, to allow the springs to set the brake disks in the normal manner. Serious problems, however, are encountered in the provision of such mechanism having a desirable degree of simplicity both as to mechanical portions and electrical control arrangement.

It is, accordingly, the principal object of the present invention to provide improved latch and control mechanism for electromagnetic friction brakes.

Another object of the present invention is to provide an improved electromagnetic friction brake mechanism which may be latched to maintain the brake friction elements in disengaged position without continuous use of electric power and released quickly and easily at will to allow the brake elements to frictionally engage and set.

Another object of the present invention is to provide improved electromagnetic friction brake latch and control mechanism which is simple, effective and inexpensive to make.

These and other objects are effected by my invention as will be apparent from the following discription taken in accordance with the accompanying drawings forming a part of this application, in which:

FIG. 1 is a phantasmal perspective view of an earth moving machine illustrating an application of the present invention;

FIG. 2 is a schematic view of the obverse side of an electromagnetic friction brake incorporating a latch mechanism in accordance with a preferred embodiment of my invention;

FIG. 3 is a section view taken along line III—III of FIG. 2;

FIG. 4 is a section view taken along line IV—IV of FIG. 2;

Figure 7:
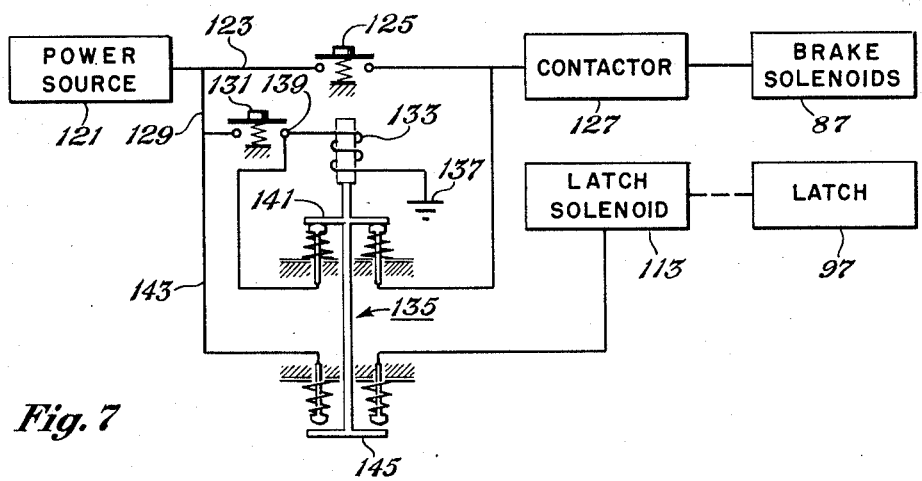
Figure 6:
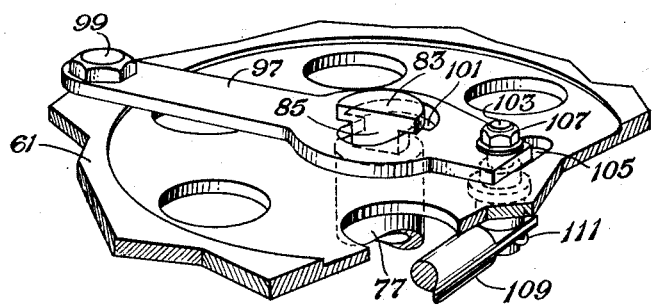
FIG. 6 is an enlarged fragmentary perspective view of the latch mechanism of FIG. 2; and, FIG. 7 is a schematic block diagram of the electric control arrangement for the brake latch mechanism.

Referring now to the drawings, in FIG. 1 there is shown in phantom a typical earth moving machine 11 having a plurality of electric wheel and axle assemblies 13, 15 supporting therebetween a main body portion 17. A primary source of electric power 19 and an operator's cab 21 are supported above the wheel and axle assembly 15 at one end of the machine 11. An electric motor driven rack 23 is fixed to the usual reciprocable gate which forms a movable end of the main body portion 17. The rack 23 is slidably supported in a suitable rack guide structure 25. The machine 11 also incorporates the usual apron and the usual digger blade control arrangement. The electric wheel motors 27 and gear reductions 29 which are incorporated into the vehicle wheels are provided with multidisk electromagnetic brake assemblies 31 which are attached to one end of each motor shaft 33. There is provided on the shaft 33 a multidisk support ring 35 which includes a hub 37, a web 39 and a rim 41. A plurality of circular planar brake disks 43 are suitably fixed to and arranged in spaced parallel relation on the periphery of the rim 41. The disks 43 rotate with the shaft 33, but they are free to move in the direction of the axis of the shaft 33. The support ring 35 is maintained in a fixed longitudinal position on the shaft 33 by an end plate 45 and a pin 47 which threadedly engages an aperture both in the plate 45 and the shaft 33.

A plurality of circular planar brake disks 49 is suitably fixed to the inner surface of a frame structure 51 and is arranged in spaced parallel relation between the several disks 43. The disks 49 do not rotate as do the disks 43, but they are disposed to move longitudinally in the direction of the axis of the shaft 33.

The frame structure 51 is fixed to the motor frame 52 and supports a brake structure 53 by means of a plurality of studs 55. One end of each stud is threaded into the frame structure 51 and the other end is received in an adjustable bushing 57 threaded in the brake structure 53. The brake structure 53 is made up of an inner movable pressure plate 59 and a fixed or stationary outer plate 61 which meet and divide along a common planar surface 62. The outer plate 61 is adjustably fixed in spaced relation to the frame 51 by the studs 55 and a spool 63 of predetermined length disposed between the bushing 57 and the frame 51. The outer plate 61 is provided with a ring 64 which is fixed to the reverse surface thereof by welding, or in any other suitable manner. In the ring 64 there is a plurality of sockets 65 in some of which there is a fixed adjustable pin 67. One end portion of a compression spring 69 is loosely fitted in the sockets 65, while the other end portion is received in a socket 71 of similar size and disposition in the pressure plate 59. The free end of the pin 67 is reciprocable in an aperture 73 provided for such purpose in the pressure plate 59.

The pressure plate 59 is provided, moreover, with a diaphragm or partition 75 to which is integrally fixed a latch plunger or protuberance 76. The latch plunger 76 includes a cylindrical spindle or shank portion 77 which is loosely received in an aperture 79 in the central region of the outer plate 61. A relatively short pin 81 and a cap or enlarged head portion 83 extend outwardly from the free end of the spindle 77 beyond the obverse surface of the plate 61. The pin 81 is generally cylindrical and is about one-half the diameter of the spindle 77. The cap is generally cylindrical, too, and is slightly larger in diameter than the pin 81, but preferably less than the diameter of the spindle 77. A portion of both the pin 81 and the cap 83 has been removed to form a flat surface 85 on each member.

A plurality of magnet coils 87 is conveniently arranged on the reverse surface of the outer plate 61 and an opposed pair of sides of each coil 87 is disposed loosely in suitable slots 89 formed in the ring 64. When each coil 87 is disposed in the slots 89, it surrounds a square-shaped pole piece 91 which is formed by the slots 89 in the ring 64. Each coil 87 is maintained in a fixed position by a pair of holding straps 93 which is appropriately attached to the plate 61 by any suitable fasteners 95 (see FIG. 5).

Figure 8:
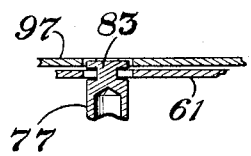
FIG. 8 is a fragmentary view, partly in section, showing a detail of the latch mechanism.

An elongated latch bar 97 is pivotally attached to the obverse surface of the plate 61 by a suitable fastener 99 adjacent one end of the bar. Near the other end of the latch bar 97 there is provided a keyhole-shaped aperture 101. This aperture has a larger portion that is slightly greater than the cap 83 of the latch plunger 76, and a smaller portion that is slightly wider than the diameter of the pin 81, but less than the cap 83. The free end of the latch bar 97 adjacent the aperture 101 is provided with a hole to threadedly receive one end of a pin 103 which projects through and is movable in a slot 105 in the plate 61. The pin 103 is maintained in the latch bar 97 by a suitable nut 107, or it may be fixed to the bar in any other suitable manner. The free end of the pin 103 is received loosely in one end of a pull rod 109 and is conveniently held therein by a cotter pin 111, or other suitable device. The pull rod 109 is connected to the core of a solenoid 113 which is fixed to the reverse surface of the plate 61. When the brake solenoids 87 are energized, the cap 83 of the latch plunger 76, of course, clears the upper surface of the latch bar 97. However, when the break solenoids are de-energized and the latch plunger is fully retracted (as shown in FIG. 8), the cap 83 does not clear the keyhole aperture 101. The latch bar 97 then rests on the cap 83 and is thus prevented from moving into its latching attitude.

The brake assemblies 31 are preferably all orientated on the vehicle wheels in position such that the latch bar 97 will drop by gravity into the lock-out position when the brake solenoids 87 are energized. This is the orientation shown in FIGS. 2 and 5. If desired, a spring may be employed to aid the gravity action. If for any reason it becomes desirable to orient the brake assemblies 31 in some other manner, then a spring may be employed to urge the latch bar 97 toward the lock-out position.

In FIG. 7 there is shown a direct current power source 121 connected via lead 123 in series with a first push button switch 125 to a contactor 127 which in turn is connected to the brake solenoids 87. The output of the power source 121 is also connected via lead 129 in series with a second push button switch 131 and the energizing coil 133 of a relay 135 to ground at 137. The junction 139 of the coil 133 and push button 131 is connected in series with a set of normally closed contacts 141 of the relay 135 to the input side of the contactor 127. The output of the power source 121 is also connected via lead 143 in series with a set of normally open contacts 145 of the relay 135 to the latch solenoid 113. The latch solenoid is of course mechanically linked to the latch bar 97. It is, of course, understood that there will be a contactor 127, brake solenoids 87 and latch solenoid 113 and latch 97 for each brake assembly 31, and these would be suitably connected in multiple in the circuit of FIG. 7. It is also understood that only one set of push buttons 125, 131 and relay 135 would be required for each brake assembly or group of brake assemblies 31 that are to be simultaneously controlled.

Figure 5:
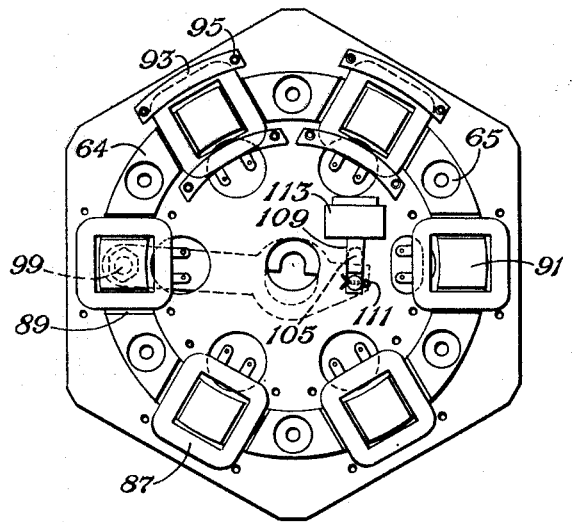
FIG. 5 is a schematic view of the reverse side of the end plate assembly of FIG. 2.

Now, in order to describe the operation of the lock-out latch mechanism, reference is made to the drawings and particularly to FIGS. 2, 7 and 8. First, assume that the machine 11 is standing with the brake assemblies 31 in the lock-out position as shown in FIGS. 2 and 5, and that it is desired to set the brakes. To do this, it is merely necessary to momentarily depress the second push button 131 to energize the relay 135. It should be noticed that the contacts of the relay 135 are spring biased so that they are movable a distance such that when the relay 135 is energized, the contacts 145 will close before the contacts 141 are opened. Then, when the push button 131 is depressed, first the contactor 127 will energize the brake solenoids to move the cap 83 out of contact with the latch bar 97 and will hold it in this position while next the contacts 145 will close to energize the latch solenoid 113 and draw the latch bar upward into the unlatched position, after which the contacts 141 will open, de-energizing the brake solenoids 87, allowing the cap 83 to be retracted, so that the brakes are set. Now, when it is desired to again lock-out the brake assembly 31 (or assemblies) the push button 125 is momentarily depressed, energizing the contactor 127 and therefore the brake solenoids 87. This causes the latch plunger 76 to move outwardly so that the cap 83 clears the latch bar aperture 101, allowing the latch bar 97 to drop or be urged into the lock-out position. Then when the push button 125 is released, the brake solenoids are de-energized, causing the latch plunger to partially retract so that the cap 83 presses on the outer surface of the latch bar. The brake assembly is now again in the lock-out condition.

It should be apparent from the foregoing description that the electromagnetic friction brake latch and control mechanism of the present invention is simple, rugged, and effective. It is clear, too, that the brake solenoids need to be energized only a fraction of the time which would otherwise be required. Further, the mechanism provides a convenient means to place the vehicle wheel drive assemblies in free-wheeling condition with power off, for towing. Finally, the brake lock-out control arrangement retains rugged reliability with economy and avoids the complexity that such a system would normally be expected to involve.

While I have shown my invention in only one form, it will be obvious to those skilled in the art that it is not so limited, but is susceptible of various changes and modifications without departing from the spirit thereof.

I claim:

1. In combination with an electromagnetic friction brake having disposed in juxtaposed co-axial relation a stationary plate, a rotatable friction disk, a non-rotatable friction disk, and a pressure plate, with said friction disks and said pressure plate being movable in the co-axial directions, said stationary plate having fixed thereto a plurality of electromagnets which move said pressure plate away from said friction disks when energized, and a plurality of springs engaging said stationary plate and said pressure plate to urge said pressure plate toward said disks when said electromagnets are de-energized; a brake lock-out latch device comprising, a spindle integrally fixed to said pressure plate and projecting into an aperture in said stationary plate, said spindle having fixed on the free end thereof a cap having lateral dimensions larger than those of said spindle; a latch bar pivotally connected adjacent one end to said stationary plate and having therein a slot adapted to loosely receive in one region thereof said spindle, said slot being shaped to pass said cap therethrough in the other region thereof, remotely actuated powered means for pivoting said latch bar into the position for receiving said spindle within said one slot region while said electromagnets are energized so as to maintain said brake disks in disengagement while said electromagnets are de-energized, and remotely actuated powered means for pivoting said latch bar into position to pass said cap through said slot when said electromagnets are momentarily energized.

2. In combination with an electromagnetic friction brake having disposed in juxtaposed co-axial relation a stationary plate, a rotatable friction disk, a non-rotatable friction disk, and a pressure plate, with said friction disks and said pressure plate being movable in the co-axial directions, and electromagnet means operable between said plate members to move said pressure plate member away from said friction disks when energized, and spring means disposed between said plate members to urge said pressure plate member toward said disks when said electromagnet means is de-energized; a brake lockout latch device comprising, a protuberance integrally fixed to said pressure plate and projecting into an aperture in said stationary plate, said protuberance having an enlarged head portion at the free end thereof and a shank portion, a latch bar pivotally connected adjacent one end to said stationary plate and having therein an aperture including a first portion shaped to pass the head portion of said protuberance therethrough and communicating with a second portion which is smaller than said head portion, remotely actuated powered means for pivoting said latch into the position wherein said shank portion is received within said aperture second portion while said electromagnet means is energized so as to maintain said brake disks in disengagement while said electromagnet means is de-energized, and remotely actuated powered means for pivoting said latch bar into position to pass said head portion when said electromagnet means is momentarily energized.

3. In combination with an electromagnetic friction brake having disposed in juxtaposed co-axial relation a stationary plate, a rotatable friction disk, a non-rotatable friction disk, and a pressure plate, with said friction disks and said pressure plate being movable in the co-axial directions, and electromagnetic means operable between said plate members to move said pressure plate away from said friction disks when energized, and spring means disposed between said plate members to urge said pressure plate member toward said disks when said electromagnet means is de-energized; a brake lock-out latch device and control system comprising, a protuberance integrally fixed to said pressure plate and projecting into an aperture in said stationary plate, said protuberance having an enlarged head portion at the free end thereof and a shank portion, a latch bar pivotally connected adjacent one end to said stationary plate and having therein an aperture including a first portion shaped to receive the head portion of said protuberance and communicating with a second portion which is smaller than said head portion, means for pivoting said latch into the position wherein said shank portion is received within said aperture second portion while said electromagnet means is energized, latch solenoid means for pivoting said latch into the position wherein said head portion may be received within said aperture first portion while said electromagnet means is energized, a first terminal for connection to an electric power source, a second terminal connected to circuit means for energizing said electromagnet means, a first control switch for selectively making and breaking the electric circuit between said first and second terminals, a relay having an energizing winding, a normally open contact and a normally closed contact and means for holding said normally closed contact in the closed position upon energization of said winding until said normally open contact has closed, circuit means connecting said energizing winding to said first terminal, a second control switch interposed between said winding and said first terminal, circuit means connecting the juncture of said second control switch and said winding in series with said normally closed contact to said second terminal, and circuit means connecting said normally open contact serially between said first terminal and said latch solenoid means.

4. An electric control system for a lock-out electromagnetic friction brake, said system comprising: brake solenoid means; energizing means for said brake solenoid means including a first input terminal; a brake latch solenoid and energizing means therefor including a second input terminal; a third terminal for connection to an electric power source; a relay having an energizing winding, a normally closed contact, a normally open contact, and means for retaining said normally closed contact in the closed position upon energization of said relay until said normally open contact has closed; a first control switch, and conductor means connecting said first control switch serially between said third terminal and said first input terminal; a second control switch; conductor means connecting said second control switch serially between said third terminal and said relay energizing winding; conductor means connecting the juncture of said first control switch and said energizing winding in series with said normally closed contact to said first input terminal; and conductor means connecting said normally open contact serially between said third terminal and said second input terminal.

References Cited by the Examiner
UNITED STATES PATENTS

| 1,991,903 | 2/35 | Logan | 188—171 X |
| 2,009,121 | 7/35 | Price | 188—171 |
| 2,321,205 | 6/43 | Hodgson | 188—171 |

MILTON BUCHLER, *Primary Examiner.*

ARTHUR L. LA POINT, *Examiner.*